United States Patent [19]
Ginnow et al.

[11] 3,869,780
[45] Mar. 11, 1975

[54] UNNAILER

[76] Inventors: Oscar H. Ginnow; Roger H. Ginnow, both of Hopbrook Rd., Bethany, Conn. 06801

[22] Filed: Nov. 1, 1973

[21] Appl. No.: 411,697

[52] U.S. Cl............................................. 29/200 D
[51] Int. Cl........................................... B23p 19/00
[58] Field of Search.. 29/200 D, 252, 200 R, 200 A, 29/200 B

[56] References Cited
UNITED STATES PATENTS
2,593,843  4/1952  Cannon......................... 29/200 D X
3,512,242  5/1970  Harvis................................. 29/252
3,740,815  6/1973  Campbell et al................. 29/200 D Primary Examiner—Thomas H. Eager
Attorney, Agent, or Firm—DeLio and Montgomery

[57] ABSTRACT

A machine for partially or completely disassembling a pallet or the like comprising a pallet support, a pair of circular steel knives suitably supported above a base frame, means for adjusting the position of the pallet support to bring selected planes of contact between deck planks and stringers into register with the knives, and means for moving the pallet support toward the knives to effect cutting of the nails substantially in said plane of contact, with minimal separation of the planks and stringer.

7 Claims, 8 Drawing Figures

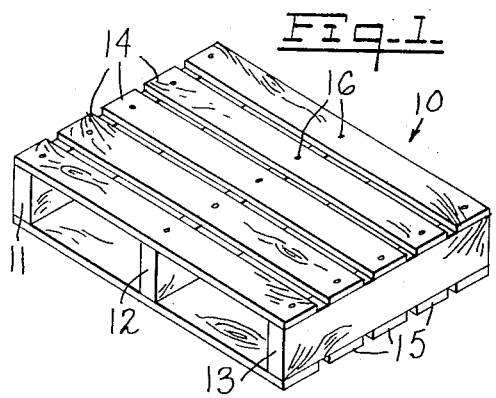
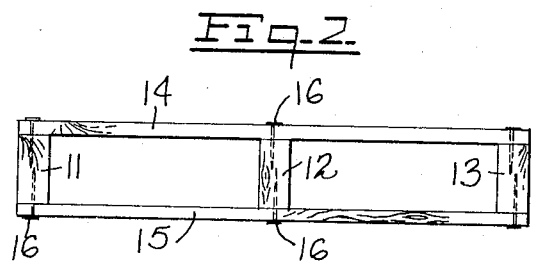
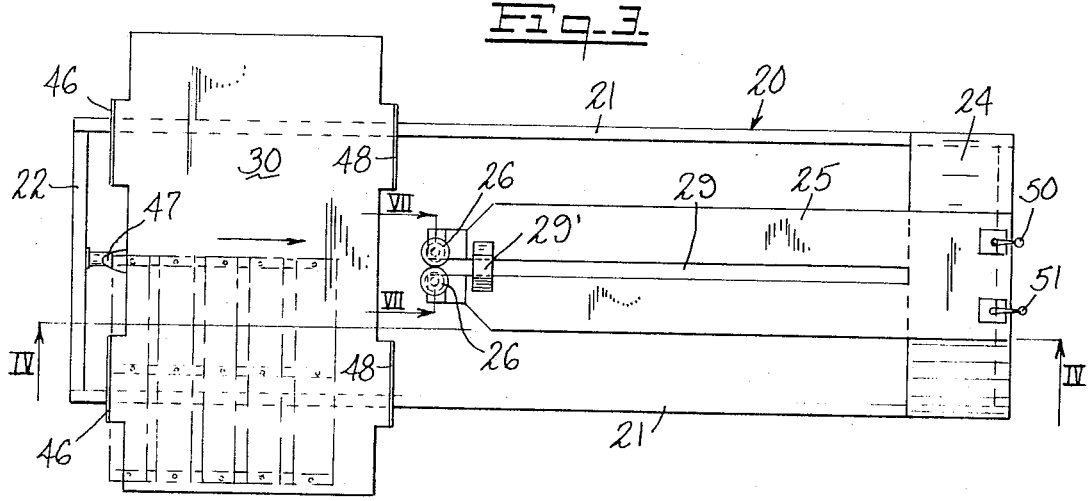
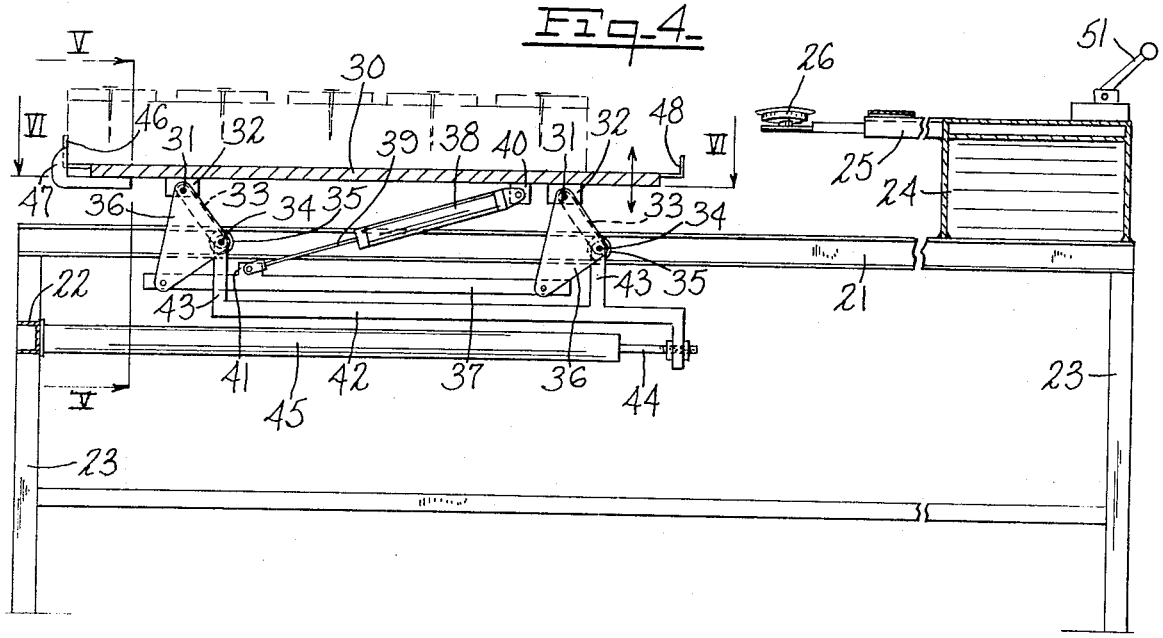

UNNAILER

This invention relates to a machine for partially or completely disassembling wooden pallets by selectively cutting the nails which hold the deck planks to the stringers, to facilitate repair, reconstruction, storage or shipment of the pallets and/or their components.

When one or more deck planks or stringers of a wooden pallet have been damaged the pallet has, heretofore, commonly been disassembled and discarded. However, some or most of the planks or stringers may be in good condition and usable in the construction of new pallets. The complete disassembly by hand of wooden pallets is a time-consuming operation and may not be economically justifiable by the possible salvaage value of the usable parts. The need for a simple and efficient machine for disassembling pallets arises not only from the desirability of effecting salvage and repair, but also as a partial solution to the problem of storage, handling and return of large numbers of pallets. Wooden pallets as such occupy substantial amounts of space, whereas their component pieces may be stored much more compactly and shipped more economically.

Prior machines for pulling pallets apart are shown in patents to Harvis, U.S. Pat. No. 3,512,242 and Campbell, U.S. Pat. No. 3,740,815, each such machine being designed to leave all the nails in the planks for subsequent removal. In the machine of the Cannon patent, U.S. Pat. No. 2,593,843, the nails of a crate are sawed by a band saw to remove all the slats from the ends of the crate.

It is an object of this invention to provide a simple and efficient machine for disassembling pallets in which the nails securing the planks to the stringers are selectively and neatly cut by knives, with minimal separation of the planks and stringer, so that good elements can be salvaged, damaged elements removed and replaced, or the entire pallet taken apart for storage, shipment or reconstruction.

A practical embodiment of the machine is shown in the accompanying drawings, wherein:

FIG. 1 represents a perspective view of a typical pallet;

FIG. 2 represents an end elevation of the pallet;

FIG. 3 represents a top plan view of the machine, a pallet in one of its positions being shown in broken lines;

FIG. 4 represents a longitudinal vertical elevation of the machine on the line IV—IV of FIG. 3, on a larger scale, parts being broken away;

FIG. 7 represents an enlarged detail section, partly in elevation, on the line VII—VII of FIG. 3, showing a stringer and adjacent deck boards of a pallet being operated on.

Figure 5:
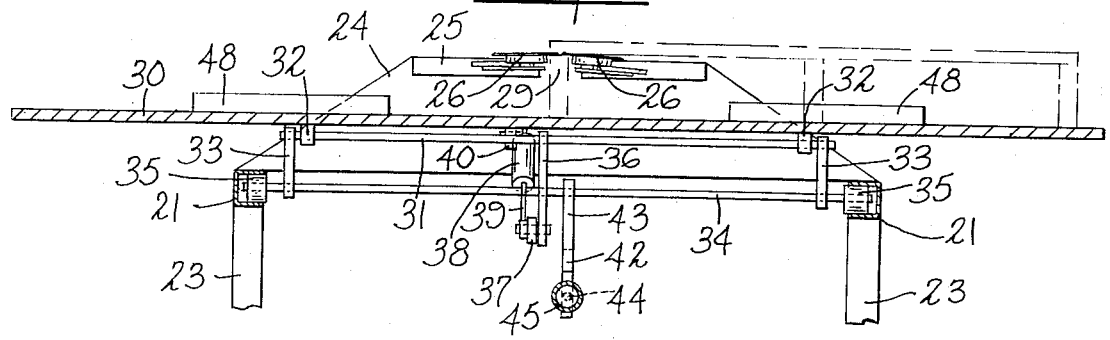
FIG. 5 represents a transverse vertical elevation on the line V—V of FIG. 4, parts of the legs being broken away.
Figure 6:
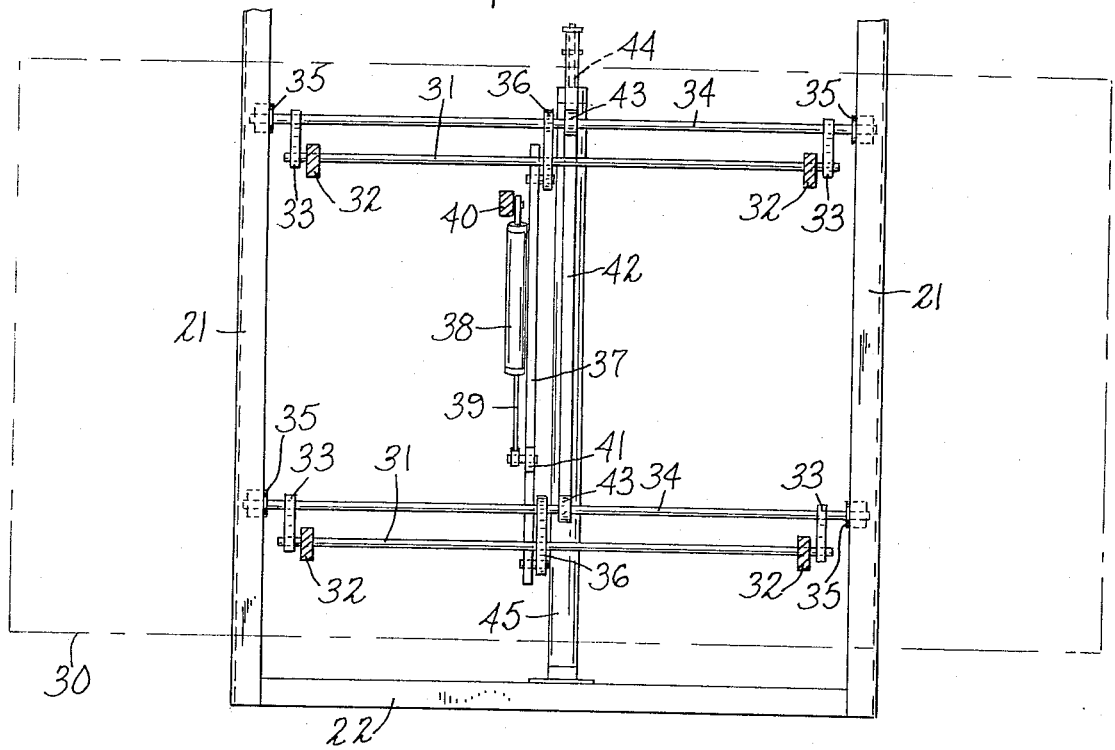
FIG. 6 represents a detail horizontal elevation on the line VI—VI of FIG. 4.

Referring to the drawings, a typical pallet 10 is shown as comprising three wooden stringers 11, 12 and 13 and a plurality of wooden upper deck boards 14 and lower deck boards 15, disposed at right angles to the stringers and nailed thereto at each crossing point by nails designated generally as 16. For purposes of illustration it must be assumed that one or more of the pallet elements (stringers and boards) has become damaged and needs replacement, or that the pallet is to be disassembled, regardless of damage, for shipment or storage or any other purpose.

Figure 7:
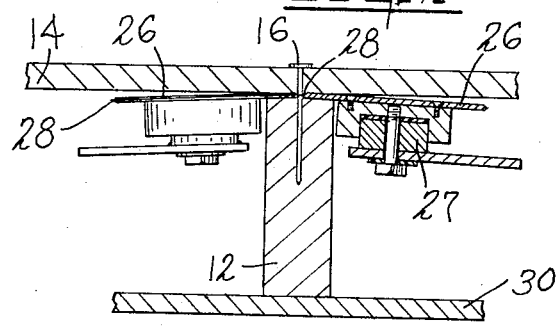
Figure 7A:
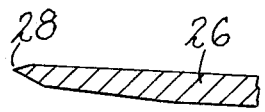
FIG. 7a represents a further enlarged detail section illustrating a preferred knife edge profile.

The machine designed to effect such disassembly comprises an elongated rectangular base frame 20, the sides of which are formed by inwardly facing channel irons 21 connected at one end by end frame member 22 and supported at a convenient height by legs 23. At the other end of the frame there is mounted a base 24 to which is secured one end of a bifurcated buck 25 which projects horizontally to about the center of the base frame. A free-running circular steel knife 26 is mounted at the end of each leg of the buck, the knives running on bearings 27 and having their cutting edges 28 as close together as possible. The bearings are preferably angled slightly, as shown in FIG. 7, to place the cutting zone in a slightly elevated position. The buck 25 is of heavy construction and supports the knives quite rigidly at a fixed elevation above the base frame.

The space 29 between the legs of the buck 25 is somewhat greater than the width of a stringer so that the stringers which are guided through said space can move back and forth sufficiently to permit each advancing nail to enter the nip of the knives, whether or not the nails are on the center line of the stringer. The legs of the buck may, if desired, be stabilized by the provision of a bridge 29', in line with the knives so that the planks and stringers can pass freely over and under it, respectively.

The flat table 30 is mounted on an adjustable support comprising a pair of rods 31 passing through lugs 32 on the bottom of the table, each end of each rod being connected by links 33 to a respective axle 34 having rollers 35 running in the tracks formed by channel irons 21. Midway between the ends of the rods 31 and axles 34 are triangular plates 36, functioning as bell-cranks, and having their lower (third) corners connected to a control bar 37. A hydraulic cylinder 38 and piston 39 are connected between a lug 40 on the bottom of the table and a bar 41 on the control bar 37 whereby actuation of the cylinder and piston moves the control bar forward or backward in relation to the table, swinging the plates 36 around the axles 34 and thus raising or lowering the table in a manner which can be very precisely controlled.

The table is designed to be moved toward either end of the base frame by means of the drive bar 42 having upwardly projecting arms 43, each engaging one of the axles 34 at its midpoint, the drive bar being connected at one end to the piston 44 of a hydraulic cylinder 45 which is supported in a horizontal position on the end frame member 22.

The table is further provided, along one edge, with upwardly projecting pusher flanges 46 and a strong back-up hook 47, and the opposite edge may be provided with pull flanges 48. The table is approximately twice as wide as a normal pallet and its length, in the direction of its movement is somewhat greater than the corresponding dimension of a pallet.

The hydraulic cylinders 38 and 45 are supplied with fluid under pressure from any convenient source, not shown, and the actuation of the cylinders is controlled by operation of the valve handles 50, 51 mounted on the base 24.

In operation, assuming that a pallet is to be completely dismantled, it is placed on the table in the position shown in broken lines in FIGS. 3 and 4, one side stringer having its end against the back-up hook and being aligned with the nip of the knives 26. The height of the table is adjusted by means of cylinder and piston 38, 39 so that the knives will contact the advancing side of the pallet exactly at the top of the stringer, and the table is then advanced by operation of the cylinder and piston 45, 44 to cause the knives to cut all the nails in that edge of the stringer, the cutting being substantially in the plane of contact between the respective deck planks and the top surface of the stringer. After a first cutting pass the table drive is reversed and the pull flanges 48 act to move the pallet back to a position free of the knives. The pallet is shifted to bring a second stringer in line with the knives, the nails are cut along the top of that stringer, as just described and the operation is repeated on the third stringer, at which point all the upper deck planks are loose and can be gathered up by the operator or other attendant. The pallet is then turned upside down, the table height is adjusted (to allow for the missing upper deck) and the lower deck planks, now on top, are cut loose in the same manner.

From the foregoing description it will be evident that any single stringer could be removed without disturbing the others and any deck plank can be removed without disturbing more than half of the planks on the same side. After cutting, the nail parts remain almost completely embedded in the wood so that undamaged pieces can be handled and reused, at least for the reconstruction or repair of pallets, substantially as if they were unused. The time-comsuming hand labor involved in manual removal of the nails is completely eliminated.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A machine for disassembling nailed wooden pallets comprising a base frame, nail cutting means, an elongated support for said cutting means mounted at one end on said base frame, a support for a pallet, means for causing relative movement of said supports to bring a pallet on the pallet support into nail cutting engagement with the cutting means and to effect cutting of the nails by continued relative movement of said supports.

2. A machine according to claim 1 wherein the nail cutting means comprises a pair of circular steel knives and the support therefor comprises a bifurcated buck having one of said knives at the end of each bifurcation.

3. A machine according to claim 2 wherein the space between the bifurcation is proportioned to freely guide a pallet stringer moving longitudinally therethrough.

4. A machine according to claim 1 wherein the pallet support is movable on said base frame toward and away from said cutting means, and which includes means associated with said pallet support for adjusting the position of said pallet support relative to the base frame.

5. A machine according to claim 1 wherein the dimension of the pallet support perpendicular to the direction of relative movement is sufficient to permit placement of the pallet on said support in a plurality of laterally adjusted positions.

6. A machine according to claim 1 wherein the base frame is elongated and comprises rails extending longitudinally thereof, the pallet support includes a table and a carriage portion movable on said rails, and means for vertically adjusting the table with respect to the carriage portion, and the means for causing relative movement being a power operated means between the base frame and the carriage.

7. A machine according to claim 6 wherein the table adjusting means includes links interconnecting the table and the carriage and power means for controlling the angularity of said links.

* * * * *